United States Patent
Grover (10) Patent No.: US 9,858,697 B2
(45) Date of Patent: Jan. 2, 2018

(54) METHODS AND SYSTEMS FOR COMMUNICATING A VIDEO IMAGE

(71) Applicant: MYINE ELECTRONICS, INC., Ferndale, MI (US)

(72) Inventor: Joey Ray Grover, Madison Heights, MI (US)

(73) Assignee: Livio, Inc., Royal Oak, MI (US)

( * ) Notice: Subject to any disclaimer, the term of this patent is extended or adjusted under 35 U.S.C. 154(b) by 33 days.

(21) Appl. No.: 14/990,479

(22) Filed: Jan. 7, 2016

(65) Prior Publication Data

US 2017/0200295 A1  Jul. 13, 2017

(51) Int. Cl.
| | |
|---|---|
| *G06T 11/60* | (2006.01) |
| *G06T 1/60* | (2006.01) |
| *G09G 5/377* | (2006.01) |
| *G06F 3/0484* | (2013.01) |

(52) U.S. Cl.
CPC .......... *G06T 11/60* (2013.01); *G06F 3/04847* (2013.01); *G06T 1/60* (2013.01); *G09G 5/377* (2013.01); *G09G 2340/125* (2013.01); *G09G 2354/00* (2013.01); *G09G 2360/121* (2013.01); *G09G 2370/16* (2013.01); *G09G 2370/22* (2013.01)

(58) Field of Classification Search
CPC ... G06T 11/60; G01C 21/3667; G01C 21/367; G01C 21/3673; G01C 21/3676
See application file for complete search history.

(56) References Cited

U.S. PATENT DOCUMENTS

| | | | | |
|---|---|---|---|---|
| 6,064,393 | A | * 5/2000 | Lengyel | G06T 15/04 345/419 |
| 9,212,918 | B1 | * 12/2015 | Newlin | G01C 21/3611 |
| 2003/0028316 | A1 | 2/2003 | Miyahara | |
| 2005/0251331 | A1 | * 11/2005 | Kreft | G01C 3/08 701/438 |
| 2005/0270311 | A1 | * 12/2005 | Rasmussen | G01C 21/32 345/677 |
| 2007/0285439 | A1 | * 12/2007 | King | G09G 5/397 345/638 |
| 2008/0059889 | A1 | 3/2008 | Parker et al. | |
| 2009/0052806 | A1 | 2/2009 | Morbey et al. | |
| 2012/0110511 | A1 | 5/2012 | Howard | |

(Continued)

OTHER PUBLICATIONS

Ford Motor Company News Release, New Version of Ford Applink Brings Smartphone Navigation Apps to Sync 3 for Touch Screen Access, Jan. 12, 2015, Detroit, Ford Motor Company, https://media.ford.com/content/fordmedia/fna/us/en/news/2015/01/12/new-version-of-ford-applink-brings-smartphone-navigation-apps-to.html downloaded on Apr. 14, 2017, 2 pages.*

(Continued)

*Primary Examiner* — Jeffery A Brier
(74) *Attorney, Agent, or Firm* — Jennifer M. Stec; Brooks Kushman P.C.

(57) ABSTRACT

A vehicle system includes a processor programed to receive a first layer of navigation map data and a second layer of navigation control data from a wireless device via a transceiver. The first layer may be transmitted at a first rate and the second layer transmitted at a second rate lower than the first rate, or only in response to a user input at a user interface of the wireless device. The processor is further programed to combine the first and second layers for output at a display.

20 Claims, 5 Drawing Sheets

(56) References Cited

U.S. PATENT DOCUMENTS

| | | | | |
|---|---|---|---|---|
| 2012/0162243 A1* | 6/2012 | Matsuo | ................ | G01C 21/367 |
| | | | | 345/592 |
| 2014/0225921 A1* | 8/2014 | Bruhn | .................... | G11B 27/00 |
| | | | | 345/633 |
| 2014/0340421 A1* | 11/2014 | Otero | ...................... | G06T 11/20 |
| | | | | 345/619 |
| 2015/0339838 A1* | 11/2015 | Friedman | ......... | G06K 19/06103 |
| | | | | 345/641 |
| 2017/0052654 A1* | 2/2017 | Cervelli | ................ | G06F 3/0482 |

OTHER PUBLICATIONS

Media Center 730N (RHR) User's Manual, 2012, Chrysler Group, downloaded on Apr. 14, 2017 from https://www.google.com/url?sa=t&rct=j&q=&esrc=s&source=web&cd=2&cad=rja&uact=8&ved=0ahUKEwiJm57N-qTTAhYKdSYKHUa9BEEQFggnMAE&url=http%3A%2F%2Fwww.jeep.com%2Fdownload%2Fpdf%2Fuconnect%2F2012-RHR-730N-Multimedia-1st.pdf%3Fmyyear_uconnect3%3D17%26, pp. 1-201.*

Media Center 730N (RER) Navigation User's Manual, 2011, Chrysler Group, downloaded on Apr. 15, 2017 from http://m.chrysler.com/download/pdf/manuals/2011_Radio_Book_RER-OM-1st.pdf, pp. 1-165.*

Mathias Johanson and Arne Lie, Layered Encoding and Transmission of Video in Heterogeneous Environments, Dec. 2002, In ACM Multimedia '02, vol. 2, 8 pages.*

\* cited by examiner

METHODS AND SYSTEMS FOR COMMUNICATING A VIDEO IMAGE

TECHNICAL FIELD

The present disclosure generally relates to an infotainment system that may communicate a video image using a multi-layer communication approach.

BACKGROUND

A navigation system guides a user to a desired destination with a map shown on a navigating display. In response to a user's request, map data stored in a server placed at a map database site are transmitted to such a navigating display as an on-vehicle navigation unit, mobile navigation unit, PDA (personal digital assistants), or mobile device, through communication means. The communication means is composed of a computer network (the Internet, for example) or a mobile communication network. The navigating terminal includes a GPS (global positioning system) to detect a vehicle's current position, and provides a map on a display thereof using both the vehicle's current position and the received map data.

Such a navigation system is advantageous in that it enables each navigating display to make reference to the newest versions of maps. However, this requires reloading the newest map data stored in a block in the navigating display whenever the map data handled in the server is updated or the user moves beyond the currently loaded map data.

A navigating display participating in the navigation system downloads all the map data in one block to renew the map data when the map data is updated in the server. In some conventional navigation systems, even when a unit of map data is partially updated in the server, the entire map data in each block is downloaded. As a result, amounts of data being received and reloaded become extremely large and impose a high communication load on a communication line. The large amount of data necessitates a longer time to process map data in the reloading operation.

SUMMARY

In at least one embodiment a vehicle system includes a processor programed to receive a first layer of navigation map data and a second layer of navigation control data from a wireless device via a transceiver. The second layer is received by the vehicle system based on a detected control input at a user interface of the wireless device. The processor is further programed to combine the first and second layer for output at a vehicle display.

Embodiments may include a method using a vehicle processor to combine a first layer received at a first predefined rate associated with navigation data and a second layer received at a second predefined rate associated with navigation control data from a device. The method includes receiving the second layer based on control input via a device user interface at a rate less than the first predefined rate. The method further includes outputting the first and second layers at a vehicle display.

In at least one embodiment, a computer-program product embodied in a non-transitory computer readable medium having stored instructions for programming a processor comprises instructions for receiving a first layer of navigation map data at a first predefined rate and a second layer of control data at a second predefined rate from a device. The computer-program product includes further instructions for combining the first and second layers for output at a display.

Embodiments may also include a mobile device having a processor programed to transmit navigation application data via a multi-layer method to the vehicle processor. The mobile device processor is further programed to execute a navigation application compatible with the vehicle processor. The mobile device processor is further programed to receive data from at least one of a server and the vehicle processor based on the navigation application. The processor is further programed to transmit a first layer having map data based on the received data and a second layer having control data for the navigation application to the vehicle processor. The second layer is transmitted based on a detected control input for the navigation application at a user interface.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (FLASH, random access memory (RAM), read only memory (ROM), electrically programmable read only memory (EPROM), electrically erasable programmable read only memory (EEPROM), or other suitable variants thereof, for example) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

The disclosure relates to a vehicle computing system having at least one processor configured to receive image data from a mobile device using two layer image communication systems and methods. The two layer image communication systems and methods include a first layer and a second layer having information being received at the vehicle computing system. The first and second layer may be received at a first and second rate. The first and second rate may be based on at least one of a predetermined amount of time, a detected change in an image for a specific layer, an input detection via a user interface control, and a combination thereof.

For example, a navigation application being executed on the vehicle computing system and mobile device may communicate application data via the two layer image communication method. The navigation application may include a first layer having map data and a second layer having user controls. The first layer having map data may include a user's position, route highlights, traffic alerts, etc., for example. The second layer may include user controls associated with the application. For example, the user controls for the navigation application may include, but are not limited to, user interaction items such as a menu button, a zoom button, and a current street view button.

The two layer image communication systems and methods enables the mobile device to reduce overall data volume by separating the two layers before transmitting the application data to the navigation application at the vehicle computing system. For example, the second layer having the user controls may be transmitted to the vehicle computing system at the second predefined frequency or rate which may be a lower frequency or rate than the first predefined frequency or rate. The second predefined rate may be based on a detected event of the user controls to improve the streaming time of the first layer. In response to the second layer being sent via the second predefined rate associated with an adjustment of user controls; the mobile device may transmit the data via the first layer at a faster rate with less delay to the vehicle computing system.

In one example, the second rate may be based on the detected change in an image for the second layer. The second predefined rate may be based on the mobile device storing a previous image transmitted to the vehicle computing system in memory of the device. The mobile device may compare a current drawing cache on a screen of the mobile device to the previous image stored in the mobile device memory. In response to no changes detected during the comparison, the current drawing cache on the screen may not be transmitted from the mobile device to the vehicle computing system. If the previous image and the current drawing cache on the screen are different, the mobile device may transmit the second layer so that the current drawing cache may be transmitted to the vehicle computing system. In another example, the mobile device may determine the second predefined rate to transmit the second layer by monitoring user input of the user controls at the mobile device screen. If user input is detected via one or more of the user controls, the mobile device may transmit the second layer having the user control data to the vehicle computing system.

The mobile device may transmit the first layer based on a detected change in an image associated with the first layer. Continuing from the example above, the mobile device may compare a current drawing cache of the map data to the previous stored image of the map data. In response to the mobile device detecting a change in the map data, the device may transmit the first layer having updated map data to the vehicle computing system. The mobile device may not transmit the first layer unless a change is detected during the compare between the current drawing cache and the previous stored image of the map data. The vehicle computing system may receive the updated map data via the first layer. The vehicle computing system may output to a vehicle display the combined first layer having the updated map layer and the second layer.

Figure 1:
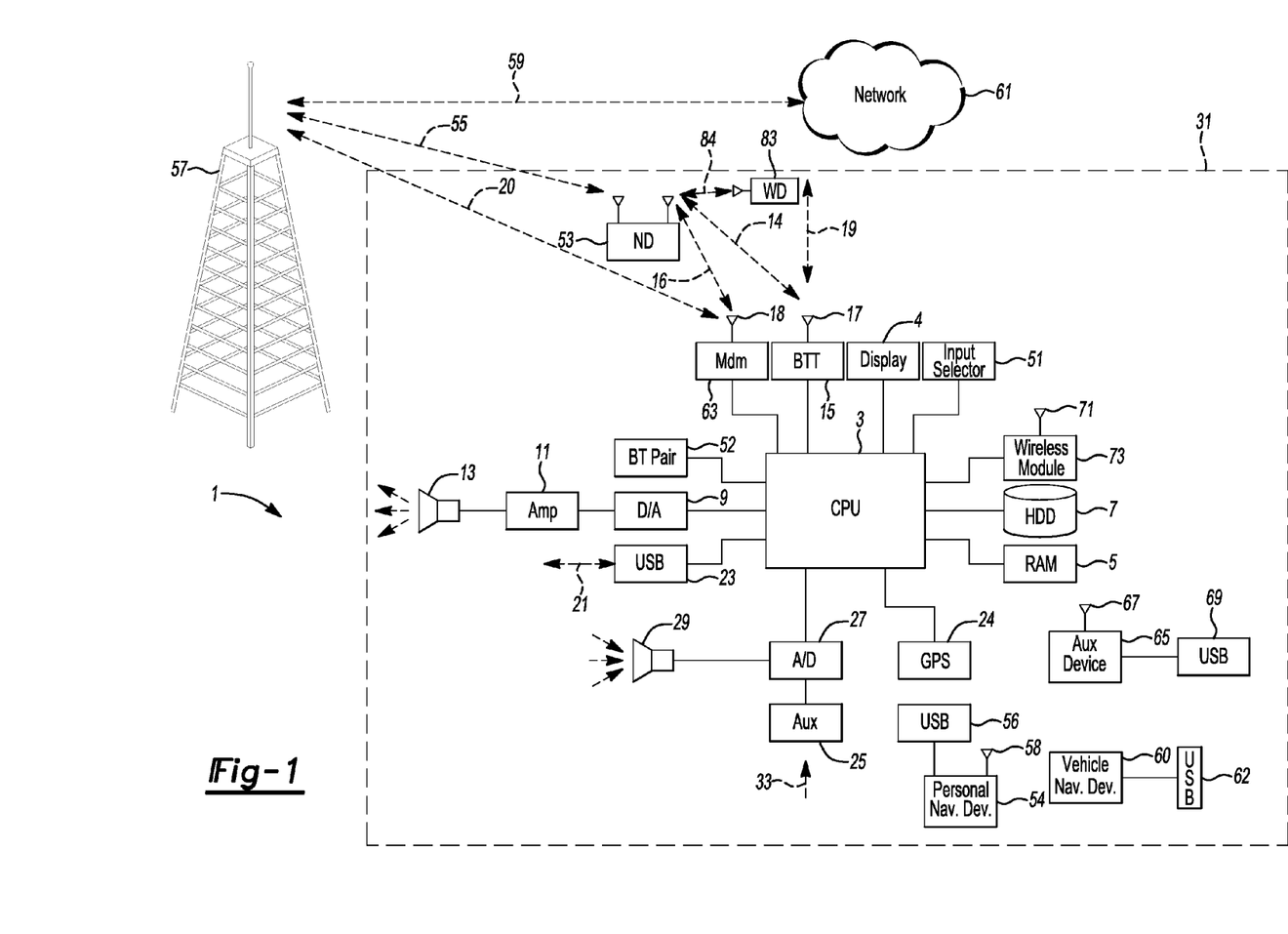
FIG. 1 is a representative topology of a vehicle computing system implementing a user-interactive vehicle information display system according to an embodiment.

FIG. 1 illustrates an example block topology for the VCS 1 for a vehicle 31. An example of such a VCS 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, or a spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor 3 is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS 1 may use a vehicle network (such as, but not limited to, a CAN bus) to pass data to and from the VCS 1 (or components thereof).

In one example, the number of different inputs may be associated with a setting for one or more vehicle features. In response to received input to adjust the setting associated with a vehicle feature, the processor 3 may communicate the adjusted setting to the vehicle feature via the vehicle network.

Outputs to the system may include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (cell phone, smartphone, tablet, PDA, or any other remote device having wireless remote network connectivity, for example). The nomadic device 53 may then be used to communicate 59 with a network 61 outside the vehicle 31 through, for example, communication 55 with a cellular tower 57. In some embodiments, tower 57 may be a WiFi access point. The nomadic device 53 may also be used to communicate 84 with an accessory device such as a wearable device 83 (smartwatch, smart glasses, etc., for example). The nomadic device 53 may communicate one or more control functions to the wearable device 83. For example, the nomadic device 53 may enable the wearable device 83 to accept a phone call, enable a mobile application, receive notifications, and/or a combination thereof. In another example, the wearable device 83 may transmit vehicle control features/functions to the VCS 1 based on one or more mobile applications executed at the nomadic device 53.

Communication between the nomadic device 53 and the BLUETOOTH transceiver 15 is represented by signal 14. Pairing a nomadic device 53 and the BLUETOOTH transceiver 15 can be instructed through a button 52 or similar input. Accordingly, the CPU 3 is instructed so that the onboard BLUETOOTH transceiver 15 may be paired with a BLUETOOTH transceiver in a nomadic device 53. In another example, the wearable device 83 and the BLUETOOTH transceiver 15 is represented by signal 14. Comparable to the nomadic device BLUETOOTH pairing process, pairing a wearable device 83 and the BLUETOOTH transceiver 15 can be instructed through a button 52 or similar input. The onboard BLUETOOTH transceiver 15 may be paired with a BLUETOOTH transceiver in a wearable device 83.

The processor 3 may be configured to communicate information to a previously paired nomadic and/or wearable device 53, 83 (a wireless device, for example). The processor 3 may be configured to request communication with a previously paired wireless device. For example, in response to the requested communication from the processor 3, the previously paired wireless device 53 may transmit an established communication message to the processor 3.

In one example, the wireless device 53 may execute one or more applications via a wireless device processor. The wireless device 53 may transmit data associated with the one or more application to the VCS 1. The wireless device 53 may be configured to transmit the data to the VCS 1 using the two layer communication method.

Data may be communicated between CPU 3 and network 61 utilizing, for example, a data-plan, data over voice, or DTMF tones associated with a wireless device 53. Alternatively, it may be desirable to include an onboard modem 63 having an antenna 18 in order to communicate 16 data between CPU 3 and network 61 over the voice band. The wireless device 53 may then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor 3 is provided with an operating system including an application program interface (API) to communicate with modem application software. The modem application software may access an embedded module or firmware on the BLUETOOTH transceiver to complete wireless communication with a remote BLUETOOTH transceiver (such as that found in a wireless device 53). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the wireless device 53 includes a modem for voice band or broadband data communication. In the data-over-voice embodiment, a technique known as frequency division multiplexing may be implemented when the owner of the wireless device 53 can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the wireless device 53, it is possible that the data-plan allows for broad-band transmission and the system could use a much wider bandwidth (speeding up data transfer). In still another embodiment, wireless device 53 is replaced with a cellular communication device (not shown) that is installed to vehicle 31. In yet another embodiment, the wireless device 53 may be a wireless local area network (LAN) device capable of communication over, for example (and without limitation), an 802.11g network (i.e., WiFi) or a WiMax network.

In one embodiment, incoming data can be passed through the wireless device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed. In another embodiment, the incoming data may be parsed into one or more layers (multi-layer, for example) at the mobile device before being transmitted to the vehicle internal processor 3. For example, the wireless device may execute a navigation application that may receive incoming data from a remote server 61. The navigation application may receive map data from the remote server. In response to the received map data, the wireless device may output a map at a user interface display. The navigation application may provide a user interface configured to control the output of the map data at the user interface display. The wireless device may transmit a first layer having the map data and second layer having the user interface to the vehicle's internal processor 3. The vehicle computing system 1 may receive the multi-layer communication from the wireless device 53. The vehicle computing system 1 may combine the received first and second layer before outputting the map data and user interface at the vehicle display 4.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. The additional sources may communicate with the vehicle computing system 1 using the multi-layer communication method. In another example, the wireless device (nomadic device 53, wearable device 83, etc., for example) may communicate with the processor via USB connection. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU 3 could be in communication with a variety of other auxiliary devices 65. These devices can be connected through a wireless 67 or wired 69 connections. Auxiliary device 65 may include, but are not limited to, personal media players, wireless health devices, portable computers, and the like. The auxiliary device 65 may communicate one or more layers of data to the vehicle computing system 1.

Also, or alternatively, the CPU 3 could be connected to a vehicle based wireless router 73, using for example a WiFi (IEEE 803.11) 71 transceiver. This could allow the CPU 3 to connect to remote networks in range of the local router 73.

In addition to having representative processes executed by a VCS 1 located in a vehicle, in certain embodiments, the processes may be executed by a computing system in communication with a vehicle computing system. Such a system may include, but is not limited to, a wireless device (a mobile phone, a smartphone, the nomadic device 53, wearable device 83 etc., for example) or a remote computing system (a server 61, for example) connected through the wireless device 53. Collectively, such systems may be referred to as vehicle associated computing systems (VACS). In certain embodiments particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) 1 located within the vehicle itself is capable of performing the processes.

Figure 2:
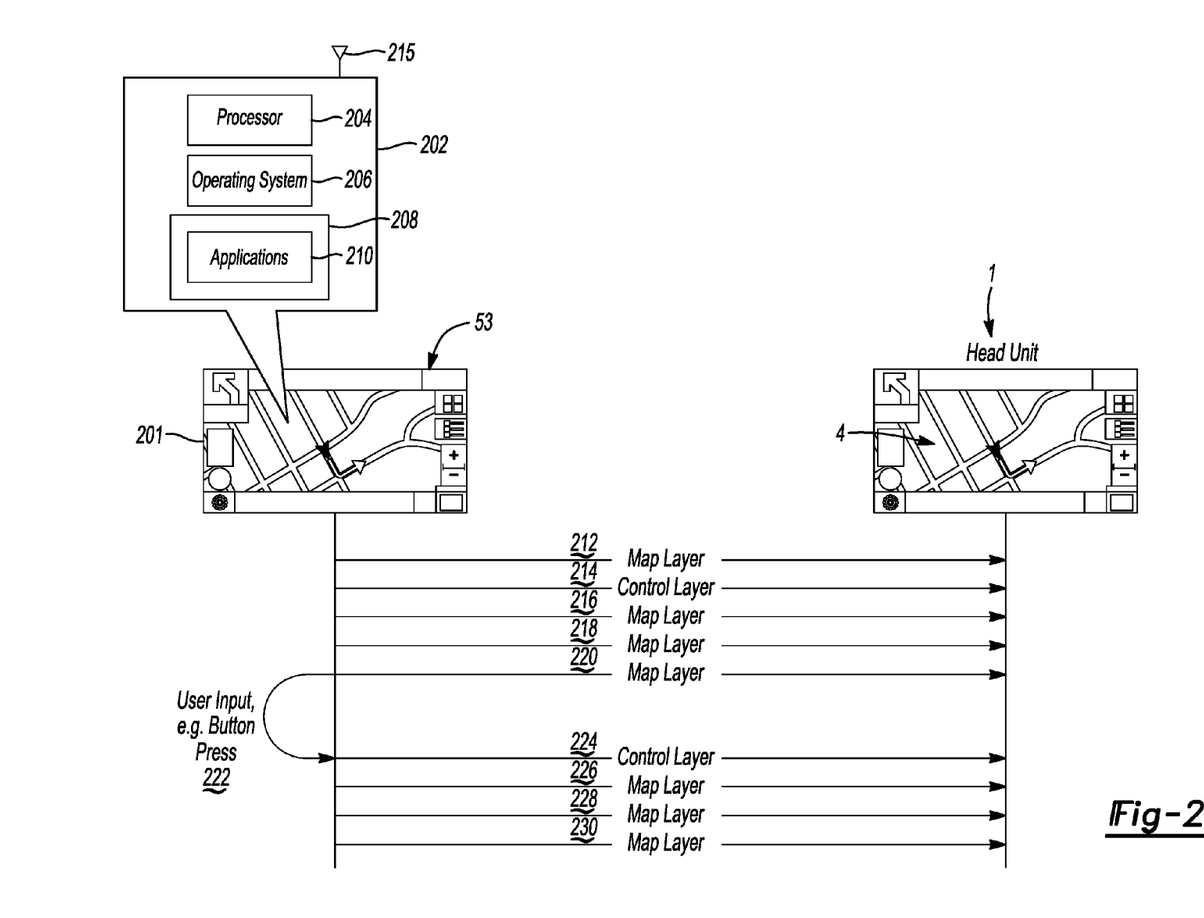
FIG. 2 shows a block diagram illustrating a wireless device communicating application data to the vehicle computing system according to an embodiment.

FIG. 2 shows a block diagram illustrating a wireless device 53 communicating application data to the vehicle computing system according to an embodiment. The VCS 1 may include one or more processors (CPU 3, for example), at least one wireless transceiver 15, and an in-vehicle display 4. The VCS 1 may communicate with the wireless device 53 via the at least one transceiver 15. The wireless devices 53 may include a system 202 comprising one or more processors 204, an operating system 206, a transceiver 215, and memory 208 to store one or more applications 210. The wireless device 53 may execute the one or more applications 210 with hardware of the system 202. The wireless device 83 may also include user interface hardware including a user interface display 201, motion detectors (accelerometer, gyroscope, etc., for example), and/or an input mechanism.

The VCS 1 may establish communication with the wireless devices 53 via a handshake process. The handshake process may include a series of communications back and forth between the VCS 1 and the wireless devices 53 for system access authentication purpose. If the handshake is complete, the VCS 1 may receive data from an application executed at the wireless device 53. For example, the handshake process may include the exchange of information to detect whether or not the wireless device 53 has been paired with the VCS 1. In another example, the VCS 1 may be executing an application associated with the wireless device 53. The application may have a key configured to verify that the VCS 1 is authorized to communicate with the wireless device 53.

The VCS 1 may launch an application at the wireless device 53 via the user interface display 4. The wireless device 53 may execute the application at the hardware of the system 202 and transmit the data to the VCS 1. In response to the received application data from the wireless device 53, the VCS 1 may output the data at the user interface display 4, speakers 13, and/or a combination thereof.

For example, the application being executed at the wireless device 53 may be a navigation application. The navigation application may provide streaming video that includes navigation data. The navigation data may include, but is not limited to, map data, traffic data, construction data, viewing control options (zooming in, zooming out, entering a new destination, selecting a point-of-interest (POI), etc., for example), and/or a combination thereof. The navigation data may also include a route generated from a current location to a destination. The wireless device 53 may receive navigation data from the VCS 1, a network server, and/or a combination thereof. The wireless device 53 may parse the navigation data associated with the navigation application into one or more layers. For example, the wireless device may parse the navigation data into two layers. The two layers include a map layer (a first layer, for example) and a control layer (a second layer, for example). The map layer may include, but is not limited to, having the map data, traffic data, and construction data. The control layer may include, but is not limited to, user interaction items such as a menu button, a zoom button, and/or the viewing control options.

In response to the VCS 1 receiving the map layer and control layer, the system may combine images from the layers before outputting the navigation data via the vehicle display 4. In one embodiment, the VCS 1 may combine the layers by overlaying the images from the second layer on top of the first layer. The VCS 1 may continue to update the layers based on the received navigation data from the wireless device 53.

Continuing from the example above, the wireless device 53 may parse the navigation data into the map layer and the control layer. The map layer may be transmitted at a first predefined frequency or rate while the control layer is transmitted at a second predefined rate. Separation of the navigation data by the device 53 into two layers and transmitting the control layer at a lower rate or only in response to user input reduces data volume and communication latency with the VCS 1. The first predefined rate may be faster than the second predefined rate. For example, the wireless device 53 may transmit 212 an initial map layer at the first predefined rate to the VCS 1. The wireless device 53 may transmit 214 an initial control layer at the second predefined rate to the VCS 1. The wireless device 53 may continue to transmit 216, 218, 220 the map layer at the first predefined rate. The wireless device 53 may detect 222 user input via the one or more user interaction items via the wireless device user interface screen 201.

In response to the detected user input 222 via the one or more user interaction items, the wireless device 53 may initiate transmission of the control layer. Alternatively, the control layer may be transmitted at the second rate independent of any user input. A combination strategy may also be used with the control layer transmitted at the second rate to periodically refresh the image or transmitted in response to user input. The wireless device 53 may transmit 224 an updated control layer to the VCS 1 based on the second predefined rate. The VCS 1 combines, composites, or overlays the received updated control layer with the map layer. The VCS 1 may output the combined map layer and updated control layer at the vehicle display 4. The wireless device 53 may continue to transmit 226, 228, 230 the map layer at the first predefined rate.

In another example, the control layer may be transmitted at a faster rate than the map layer based on continuous user input at the one or more user interaction items.

Figure 3:
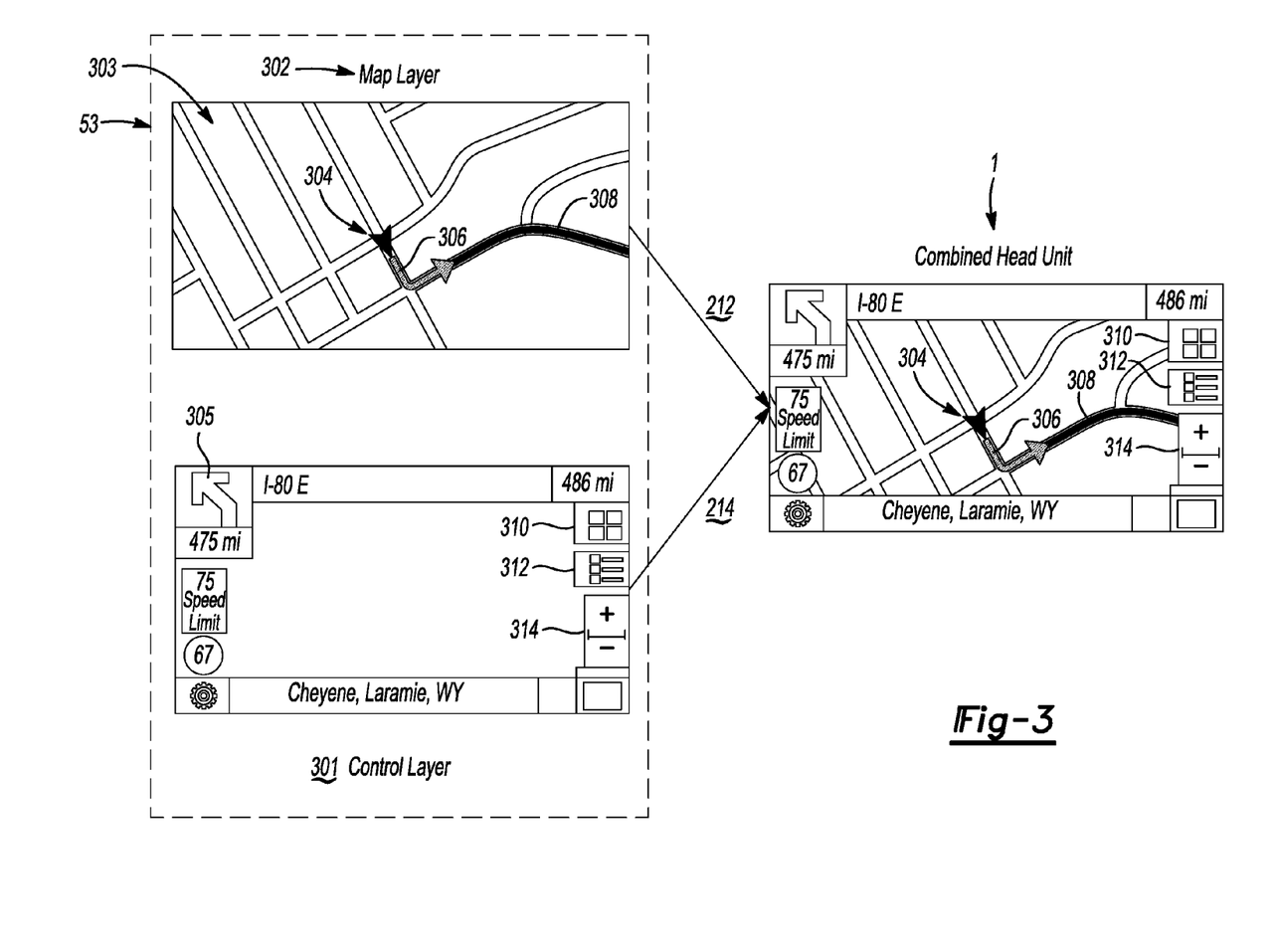
FIG. 3 shows an illustrative example of the wireless device providing multi-layer communications to the vehicle computing system according to an embodiment.

FIG. 3 shows an illustrative example of the wireless device 53 providing multi-layer communications to the VCS 1 according to an embodiment. The VCS 1 may have one or more applications executed on hardware of the system to provide a navigation application 210 at the vehicle user interface display 4. The map layer 302 includes, but is not limited to, a map 303, a current location 304, an upcoming route instruction 306, a highlighted route 308, and/or a combination thereof. The control layer 301 includes, but is not limited to, user interactive controls 305, a POI selection 310, traffic information 312, and viewing control options 314.

Continuing from the example above, the wireless device 53 may transmit 212 the map layer 302 as the first layer and the control layer 301 as the second layer to the VCS 1. In other embodiments, the wireless device 53 may parse two or more layers associated with application data. The wireless device 53 may transmit the parsed two or more layers to the VCS 1. In response to the VCS 1 combining the received map layer 302 and control layer 301, the system may output the current control layer 301 overlaid on the map layer 302.

In one example, in response to the user selecting the viewing control options 314 of zooming out of a current map view, the wireless device 53 may transmit an updated control layer based on the user selection. The wireless device 53 may zoom out of the current map view and transmit an updated map layer 302 to the VCS 1 based on the user selection of zooming out via the user interactive controls.

Figure 4:
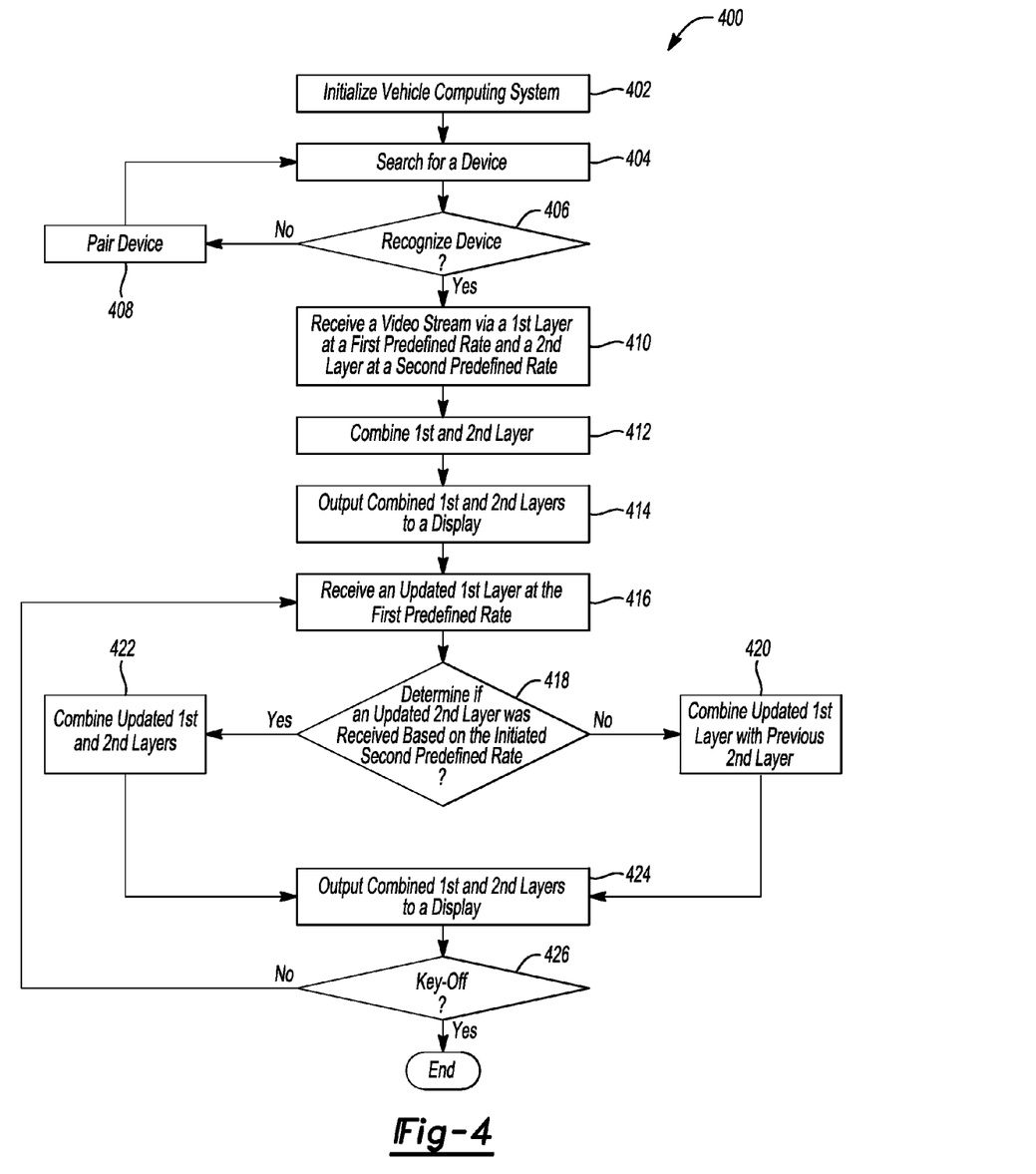
FIG. 4 is a flow chart illustrating an example method of the vehicle computing system communicating with the wireless device.

FIG. 4 is a flow chart illustrating operation of an example system or method of the VCS 1 communicating with the wireless device 53. The system or method 400 may include instructions for communicating video stream data via a multi-layer method and combining the multi-layer method for output at a vehicle display. The method 400 may be implemented using software code contained within the VCS 1. In other embodiments, the method 400 may be implemented in other vehicle controllers (one or more modules, for example), or distributed among multiple vehicle modules.

Referring again to FIG. 4, the vehicle and its components illustrated in FIG. 1 through FIG. 3 are referenced throughout the discussion of the method 400 to facilitate understanding of various aspects of the present disclosure. The method 400 of outputting multi-layer video stream data via a communication link with the wireless devices 53 may be implemented through a computer algorithm, machine executable code, or software instructions programmed into a suitable programmable logic device(s) of the vehicle, such as the processor 3, the device processor, another controller in communication with the vehicle computing system, or a combination thereof. Although the various operations shown in the flowchart diagram 400 appear to occur in a chronological sequence, at least some of the operations may occur in a different order, and some operations may be performed concurrently or not at all.

In operation 402, the VCS 1 may be initialized and enabled based on a key-on position or state of an ignition system. The VCS 1 may initialize one or more applications for execution. In response to the initialization of the VCS 1, the system may display one or more applications at a user interface display. For example, the VCS 1 may execute an application configured to communicate with a wireless device 53 connected to the system via a communication link (USB, BLUETOOTH, etc., for example). The VCS 1 may receive the communication of data between the wireless device 53 and the applications being executed on hardware at the system.

The VCS 1 may search for the wireless device 53 based on the initialization of the system in operation 404. In response to a detected device within a vehicle cabin, the VCS 1 may determine if the device is recognized as a previously paired device while estimating a location for the device within the vehicle cabin in operation 406. If the location of the device is not recognized within the vehicle cabin, the VCS 1 may transmit a request for a seat location to the device. For example, the VCS 1 may request that a vehicle occupant associated with the device enter the seat location (front seat passenger, backseat passenger, etc., for example) via the vehicle user interface screen. In another example, vehicle occupants may enter their seat location via their wireless device user interface screen and transmit the location to the VCS 1 via their device 53. If a driver device is identified as the wireless device 53, the VCS 1 may enable a lock-out feature to prevent driver input via the driver device user interface screen.

In operation 408, the VCS 1 may request to pair an unrecognized device based on a pairing process (a security handshake process, for example). In response to a completed pairing process, the VCS 1 may establish communication with the paired wireless device. The VCS 1 may receive a video stream via an application executed at the wireless device 53 as represented at 410. The wireless device 53 may transmit the video stream via a first layer at a first predefined rate and a second layer at a second predefined rate. In one example, the first predefined rate may be higher, faster, or more frequent than the second predefined rate.

The VCS 1 may combine the first and second layer so that the video stream may be presented at the user interface display as represented at operation 412. After combining the layers, the VCS 1 may output the combined layers to a display in operation 414. Alternatively, the VCS 1 may output the layers individually to designated memory locations for display to effectively combine, overlay, or composite images represented by the data contained in the first and second layers. The VCS 1 may continuously receive an updated first layer at the first predefined rate in operation 416.

In response to a determination by the VCS 1 in operation 418 that no updated second layer was received, the system may combine the updated first layer with the previously transmitted second layer in operation 420. In response to a received updated second layer by the VCS 1, the system may combine the updated first layer with the updated second layer in operation 422. In operation 424, the VCS 1 may output the combined updated first layer with at least one of the previously sent second layer or the updated second layer. The VCS 1 may end the method of receiving the multi-layer video stream via the wireless device 53 based on a detection of a key-off position of the ignition system in operation 426.

Figure 5:
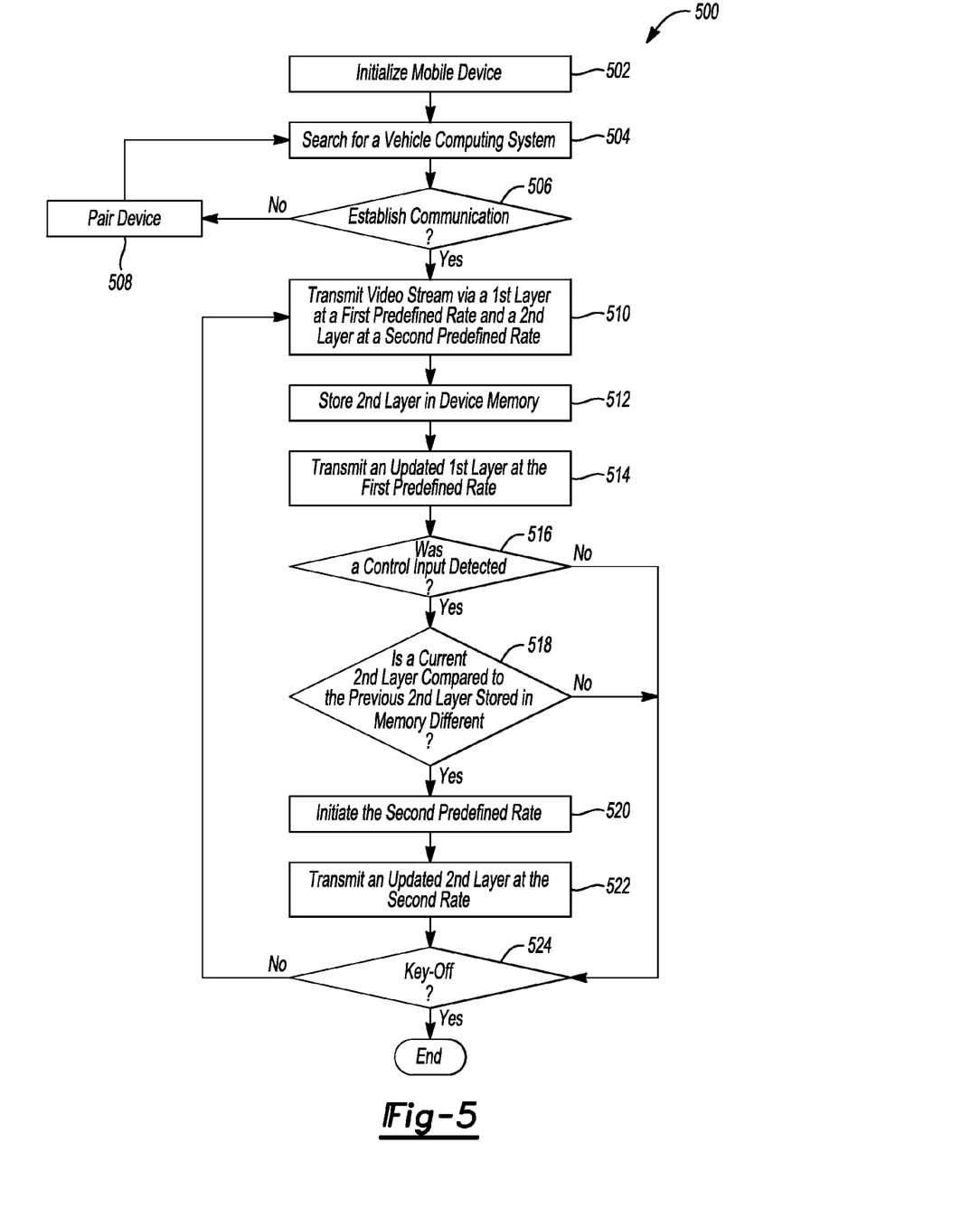
FIG. 5 is a flow chart illustrating an example method of a two layer video stream communicated to the vehicle computing device.

FIG. 5 is a flow chart illustrating an example method 500 of a two layer video stream communicated to the VCS 1. The method 500 may include instructions to parse application data into one or more layers for a video stream transmission to a VCS 1. The method 500 may be implemented using software code contained within the wireless device. In other embodiments, the method 500 may be implemented in other controllers (one or more modules, for example), or distributed among multiple vehicle modules.

Referring again to FIG. 5, the wireless device and its components illustrated in FIG. 1 through FIG. 3 are referenced throughout the discussion of the method 500 to facilitate understanding of various aspects of the present disclosure. The method 500 of communicating the two layer video stream via a communication link between the VCS 1 and wireless device 53 may be implemented through a computer algorithm, machine executable code, or software instructions programmed into a suitable programmable logic device(s) of the vehicle, such as the processor 3, the device processor, another controller in communication with the wireless device 53, or a combination thereof. Although the various operations shown in the flowchart diagram 500 appear to occur in a chronological sequence, at least some of the operations may occur in a different order, and some operations may be performed concurrently or not at all.

In operation 502, the wireless device 53 may be initialized and enabled based on a power-on request. The wireless device 53 may initialize one or more applications for execution based on the power-on request. In response to the initialization of the wireless device 53, the device may display one or more applications at a user interface. For example, the wireless device 53 may execute an application configured to communicate with a VCS 1 via a communication link (USB, BLUETOOTH, etc., for example). The wireless device 53 may manage the communication of data between the VCS 1 and the applications being executed on hardware at the VCS 1.

In operation 504, the wireless device 53 may search for a VCS 1 based on the initialization of the device. In response to a detected VCS 1, the wireless device 53 may determine if the VCS 1 is recognized as a previously paired system before establishing a communication link in operation 506.

The wireless device 53 may request a pairing process with the VCS 1 in response to an unrecognized VCS 1 in operation 508. The wireless device 53 may generate a video stream based on the execution of one or more applications on hardware of the device. The wireless device 53 may separate and transmit the video stream in one or more layers.

For example, the wireless device 53 executing a navigation application may generate a navigation video stream in two layers. The wireless device 53 may transmit the navigation video stream via a first layer at a first predefined rate and a second layer at a second predefined rate in operation 510. The first layer may be configured to include continuously updated data such as a map, traffic information, construction information, and/or a combination thereof. In another example, the first layer transmitted via the first predefined rate by the wireless device may be based on a detected change in an image associated with the first layer. The second layer may be configured to include user input controls that may be initiated by a user via the wireless device user interface screen. The second layer may be transmitted at the second predefined rate.

In operation 512, the wireless device 53 may store the second layer in device memory. In response to an updated first layer, the wireless device 53 may transmit the updated first layer at the first predefined rate in operation 514. For example, the wireless device 53 may detect an updated first layer by comparing a current first layer to a previous first layer stored in device memory. In response to a detected change based on the compare, the wireless device may transmit the first layer to the VCS 1. The wireless device may determine if a control input was detected in operation 516.

In response to a detected control input at the wireless device 53 user interface screen, the device may compare a current second layer to the previous second layer stored in device memory in operation 518. If the wireless device 53 detects a difference between the compared layers, the device may initiate the second predefined rate in operation 520.

In operation 522, the wireless device may transmit an updated second layer at the second predefined rate based on the detected difference between the current second layer and the previously stored second layer. The mobile device 53 may end the method of communicating the two layer video stream to the VCS 1 based on a detection of a power-down or a disconnection of the communication link in operation 524.

While representative embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:
1. A vehicle system comprising:
   a processor programed to,
      receive, from a wireless device via a transceiver, a first layer of video stream data of a navigation map and a second layer of video stream data of navigation controls, the second layer being updated based on detected control input at a user interface of the wireless device; and overlaying the second layer video data stream over the first layer video data stream for output at a vehicle display.

2. The system of claim 1, wherein the processor receives the first layer of data transmitted by the wireless device based on a detected change of data in response to comparing a current first layer to a first layer previously stored in memory of the wireless device.

3. The system of claim 1, wherein the navigation map data is at least one of a current position, route highlights, or a destination.

4. The system of claim 1, wherein the navigation control data is at least one of a menu button, a zoom button, or a current street view.

5. The system of claim 4, wherein the processor is further programmed to receive an image update via the second layer based on user input of the at least one of the menu button, zoom button, or current street view.

6. The system of claim 1, wherein the detected control input is based on the wireless device having a device processor configured to compare a current drawing cache on the user interface of the wireless device to a previous image stored in memory of the wireless device.

7. The system of claim 6, wherein the processor is further programed to, in response to no changes detected during the comparison between the current drawing cache and the previous image, output the previously received second layer from the wireless device.

8. The system of claim 6, wherein the processor is further programed to, in response to a detected change during the comparison between the current drawing cache and the previous image, output the current drawing cache to the vehicle display.

9. The system of claim 1, wherein the processor is further programed to, in response to a device location identifying a driver device as the wireless device, enable a lock-out feature to prevent driver input via the driver device.

10. A method comprising:
combining, via a vehicle processor, a first data layer of video stream data received at a first rate associated with navigation data and a second data layer of video stream data received at a second rate associated with navigation control data from a device; and
overlaying the second layer video data stream over the first layer video data stream at a vehicle display.

11. The method of claim 10, wherein the navigation data is at least one of a current position, route highlights, or a destination.

12. The method of claim 10, wherein the navigation control data is at least one of a menu button, a zoom button, or a current street view.

13. The method of claim 12, further comprising receiving an image update via the second layer based on user input of the at least one of the menu button, zoom button, or current street view.

14. The method of claim 10, wherein the control input is based on comparing a current drawing cache on the device user interface to a previous image stored in device memory.

15. The method of claim 14, further comprising receiving the second layer data from the device transmitted only in response to changes detected during the comparison between the current drawing cache and the previous image.

16. The method of claim 15, further comprising transmitting the second layer data at the second rate based independent of a detected change during the comparison between the current drawing cache and the previous image.

17. A computer-program product embodied in a non-transitory computer readable medium having stored instructions for programming a processor, comprising instructions for:
receiving, via a vehicle navigation system from a wireless device coupled to the vehicle navigation system, a first layer of video stream data of a navigation map at a first rate and a second layer of video stream data of control data at a second rate slower than the first rate; and
overlaying the second layer video data stream over the first layer video data stream for output at a vehicle display.

18. The computer-program product of claim 17, wherein the non-transitory computer readable medium further comprises instructions for coupling the wireless device to the vehicle navigation system.

19. A device comprising:
a processor programed to,
execute a navigation application;
receive data from a server based on the navigation application; and
transmit a first layer of video stream data having map data based on the data and a second layer of video stream data having control data for the navigation application to a vehicle processor, the second layer being updated based on a detected control input for the navigation application at a user interface.

20. The device of claim 19, wherein the processor is further programed to receive vehicle data from the vehicle processor, wherein the vehicle data is associated with a vehicle navigation application configured to communicate with the navigation application.

* * * * *